US00RE45285E

(19) United States
(12) Reissued Patent
Wang

(10) Patent Number: US RE45,285 E
(45) Date of Reissued Patent: Dec. 9, 2014

(54) OPTIMIZING TRANSMISSION FOR BROADCAST MULTICAST SERVICE

(71) Applicant: LG Electronics Inc., Seoul (KR)

(72) Inventor: Shu Wang, San Diego, CA (US)

(73) Assignee: LG Electronics Inc., Seoul (KR)

(21) Appl. No.: 14/142,530

(22) Filed: Dec. 27, 2013

Related U.S. Patent Documents

Reissue of:
(64) Patent No.: 8,085,862
Issued: Dec. 27, 2011
Appl. No.: 12/245,520
Filed: Oct. 3, 2008

U.S. Applications:
(60) Provisional application No. 60/977,136, filed on Oct. 3, 2007, provisional application No. 61/014,646, filed on Dec. 18, 2007, provisional application No. 61/029,848, filed on Feb. 19, 2008, provisional application No. 61/029,850, filed on Feb. 19, 2008.

(51) Int. Cl.
*H04L 27/28* (2006.01)

(52) U.S. Cl.
USPC ..... 375/260

(58) Field of Classification Search
USPC ..... 375/130, 260, 267, 285, 295, 299; 370/208–209, 335, 342; 455/101–102
See application file for complete search history.

(56) References Cited

U.S. PATENT DOCUMENTS

| | | | | |
|---|---|---|---|---|
| 5,892,879 | A | 4/1999 | Oshima | |
| 6,101,225 | A * | 8/2000 | Thorson | 375/308 |
| 6,356,569 | B1 | 3/2002 | Sonalkar et al. | |
| 6,373,831 | B1 * | 4/2002 | Secord et al. | 370/342 |
| 7,212,549 | B1 | 5/2007 | Wimmer | |
| 7,630,451 | B2 * | 12/2009 | Collins et al. | 375/261 |
| 7,720,027 | B2 * | 5/2010 | Ling et al. | 370/328 |
| 7,724,838 | B2 * | 5/2010 | Mantravadi | 375/295 |
| 7,978,649 | B2 * | 7/2011 | Howard et al. | 370/329 |
| 7,995,671 | B2 * | 8/2011 | Kim et al. | 375/267 |
| 2005/0068918 | A1 | 3/2005 | Mantravadi et al. | |

(Continued)

FOREIGN PATENT DOCUMENTS

| | | |
|---|---|---|
| CN | 101022446 | 8/2007 |
| EP | 1335518 | 8/2003 |

(Continued)

OTHER PUBLICATIONS

The State Intellectual Property Office of the People's Republic of China Application Serial No. 200880105604.5, Office Action dated Aug. 3, 2012, 11 pages.

(Continued)

*Primary Examiner* — Khanh C Tran
(74) *Attorney, Agent, or Firm* — Lee, Hong, Degerman, Kang & Waimey

(57) ABSTRACT

The present invention is method and system for transmitting a signal in a wireless communication system. The present invention includes differentiating a data stream into at least a first layer data stream and a second layer data stream. At least the first layer data stream and the second layer data stream are then channel coded. Afterward, at least one of the channel coded first layer data stream and the channel coded second layer data stream is spread.

18 Claims, 12 Drawing Sheets

(56) References Cited

U.S. PATENT DOCUMENTS

| | | | | |
|---|---|---|---|---|
| 2005/0107053 | A1* | 5/2005 | De Courville et al. | 455/234.1 |
| 2005/0135457 | A1* | 6/2005 | Molisch et al. | 375/130 |
| 2006/0183287 | A1 | 8/2006 | Collins et al. | |
| 2007/0133691 | A1* | 6/2007 | Kozat | 375/240.24 |
| 2010/0039928 | A1* | 2/2010 | Noh et al. | 370/210 |

FOREIGN PATENT DOCUMENTS

| | | |
|---|---|---|
| JP | 2006-261982 | 9/2006 |
| KR | 1996-0701530 A | 2/1996 |
| WO | 2006/076451 | 7/2006 |
| WO | 2006/076599 | 7/2006 |
| WO | 2006/138203 | 12/2006 |
| WO | 2007/089110 | 8/2007 |

OTHER PUBLICATIONS

Wang, et al., "On Enhancing Hierarchical Modulations," 3rd Generation Partnership Project 2, 3GPP2 Draft, COO-NTAH-20070827-009-LGE-LAYER Modulation, vol. TSGC, XP062166129, Aug. 2007, 23 pages.

European Patent Office Application Serial No. 08836623.2, Search Report dated Jul. 17, 2014, 10 pages.

* cited by examiner

OPTIMIZING TRANSMISSION FOR BROADCAST MULTICAST SERVICE

Matter enclosed in heavy brackets [ ] appears in the original patent but forms no part of this reissue specification; matter printed in italics indicates the additions made by reissue.

CROSS-REFERENCE TO RELATED APPLICATIONS

[Pursuant to 35 U.S.C. §119, this] *This* application *is a reissue application of U.S. Pat. No. 8,085,862 B2, issued from U.S. patent application Ser. No. 12/245,520, filed on Oct. 3, 2008, which* claims the benefit of [earlier filing date and right of priority to] U.S. Provisional Application No. 60/977,136, filed on Oct. 3, 2007, U.S. Provisional Application No. 61/014,646, filed on Dec. 18, 2007, U.S. Provisional Application No. 61/029,848, filed on Feb. 19, 2008, and U.S. Provisional Application No. 61/029,850, filed on Feb. 19, 2008, the contents of which are hereby incorporated by reference herein in their entirety.

FIELD OF THE INVENTION

The present invention relates to optimizing a transmission in a wireless communication system, and more specifically, for a broadcast multicast service.

BACKGROUND OF THE INVENTION

Generally, Forward Link Only (FLO) technology provides a scheme for delivering video to mobile terminals. FLO uses the same radio frequency in each cell so there are no handoffs as there are in traditional cellular systems. It also uses a layered modulation approach in which a base layer is transmitted along with an enhancement layer. The base layer reaches all mobile terminals in an entire coverage area, while the enhancement layer provides a faster video frame rate in mobile terminals closer to a data source (transmitter). The layered method allows for a graceful degradation of service.

FLO technology is an air interface with multicasting capabilities designed to increase capacity and reduce content delivery costs to the mobile terminals. FLO technology enables mobile users to see and hear high quality video and audio, browse and buy merchandise, or watch a stock ticker wherever the users happen to be, and at anytime without delays. Designed to multicast significant volumes of rich multimedia content, FLO enables wireless operators to cost-effectively deliver news, entertainment, and informational programming in clips and streaming video to many mobile users at once. FLO provides the technology for distributing multimedia content efficiently and economically without impacting current networks.

Accordingly, schemes are needed to improve upon the delivery of content to the mobile users.

SUMMARY OF THE INVENTION

The present invention is directed to optimizing a transmission in a wireless communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method and system for transmitting a signal in a wireless communication system comprising differentiating a data stream into at least a first layer data stream and a second layer data stream, channel coding at least the first layer data stream and the second layer data stream; and spreading at least one of the channel coded first layer data stream and the channel coded second layer data stream.

Preferably, a Fourier transform is applied to at least one of the channel coded first layer data stream and the channel coded second layer data stream. Preferably, the first layer is an enhancement layer and the second layer is a base layer.

The first layer data stream may be spread using a Walsh-Hadmard matrix. Alternatively, the first layer data stream is spread using a quasi-orthogonal function.

The channel coded second layer data stream may be spread using an identity matrix. Alternatively, the channel coded second layer data stream is spread using a Walsh-Hadmard matrix.

In one embodiment, at least one of power control, phase adjusting and subcarrier mapping is applied to at least one of the spread channel coded first layer data stream and the spread channel coded second layer data stream.

In another embodiment, the transformed first layer data stream and second layer data stream is transmitted according to at least one of a channel condition and a quality of service requirement of the data stream to be transmitted.

The data stream may include, or be transmitted along with, a flow description message comprising a transmit mode extension field. The data stream may also include, or be transmitted along with, a system parameters message comprising a control channel transmit mode extension field.

In accordance with another embodiment of the present invention, a method and system for transmitting a signal in a wireless communication system comprises differentiating a data stream into at least a first layer data stream and a second layer data stream, channel coding the first layer data stream using second layer channel coding, channel coding the second layer data stream using first layer channel coding, and spreading at least one of the channel coded first layer data stream and the channel coded second layer data stream.

A Fourier transform may be applied to at least one of the spread channel coded second layer data stream and the spread channel coded first layer data stream. Preferably, channel coding the first layer data stream using second layer channel coding and channel coding the second layer data stream using first layer channel coding is dependent on a stream-to-layer mapping scheme. Preferably, the first layer is an enhancement layer and the second layer is a base layer.

In one embodiment, at least one of power control, phase adjusting and subcarrier mapping is applied to at least one of the spread channel coded first layer data stream and the spread channel coded second layer data stream.

In another embodiment, the transformed first layer data stream and second layer data stream are transmitted according to at least one of a channel condition and a quality of service requirement of the data stream to be transmitted.

In accordance with another embodiment of the present invention, a method and system for transmitting a signal in a wireless communication system comprises channel coding at least a first data stream into a first layer data stream and a second data stream into a second layer data stream, spreading at least one of the channel coded first layer data stream and the channel coded second layer data stream, and applying at least one of power control, phase adjusting and subcarrier mapping to at least one of the spread channel coded first layer data stream and the spread channel coded second layer data stream. Preferably, the first layer is an enhancement layer and the second layer is a base layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
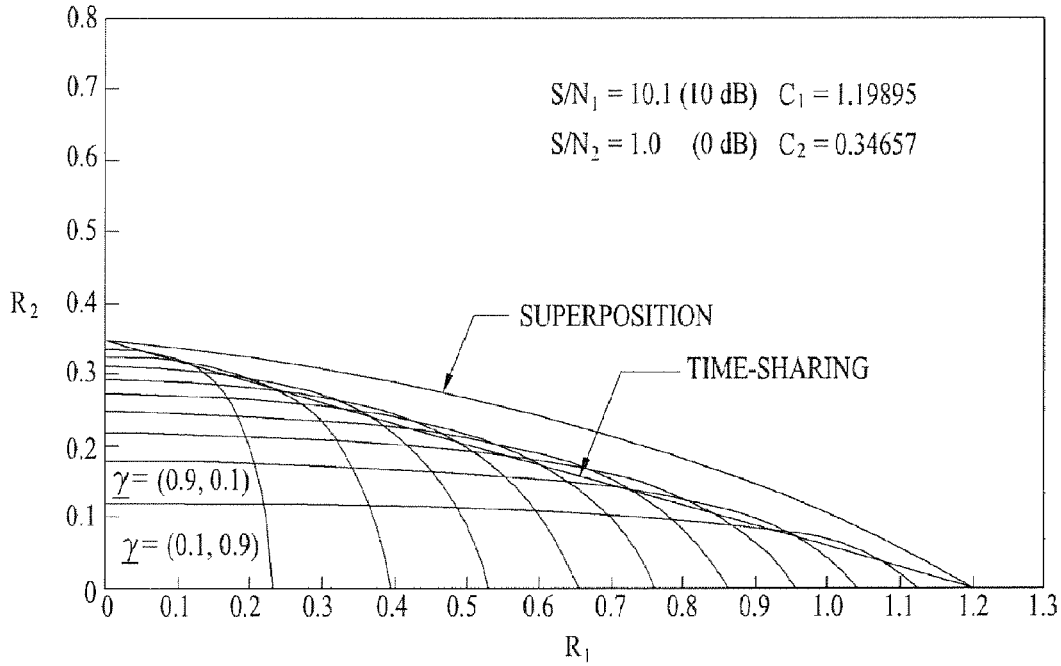
FIG. 1 is a graph of achievable transmission rates on a broadcast channel with additive white Gaussian noise.

The present invention relates to optimizing a transmission for a broadcast multicast service.

In accordance with embodiments of the present invention, a precoded orthogonal frequency division multiplexing (P-OFDM) scheme and overloaded transmission schemes are provided for a communication system using a forward link only air interface (FLO AI) protocol. The present invention provides backward compatibility and high spectral efficiency, and is optimized for delivering scalable layered content.

Orthogonal frequency division multiplexing (OFDM) is a modulation technique that enables user data to be modulated onto tones, or subcarriers. For each OFDM symbol duration, information-carrying symbols are loaded on each tone. The information is modulated onto a tone by adjusting the tone's phase, amplitude or both. Basically, a tone may be enabled or disabled to indicate a bit value of one or zero. Either quadrature phase shifting keying (QPSK) or quadrature amplitude modulation (QAM) may be employed. The FLO AI protocol supports the use of QPSK, 16-QAM and layered modulation techniques. Non-uniform 16-QAM constellations (two layers of QPSK signals) with two bits applied per layer may be utilized in layered modulation.

In accordance with the present invention, QPSK is a modulation scheme in which a carrier is sent in four phases and the change in phase from one symbol to the next encodes two bits per symbol. QAM is a modulation scheme wherein information is encoded into a carrier wave by variation of the amplitude of both the carrier wave and a quadrature carrier that is 90° out of phase with the main carrier in accordance with two input signals. In 16-QAM, four different phases and four different amplitudes are used for a total of 16 different symbols.

In one embodiment, the present invention provides a strictly backward compatible (SBC) phase for the FLO AI protocol. Preferably, an enhanced layered modulation scheme is combined with OFDM to accomplish the SBC phase. Alternatively, a precoded OFDM (P-OFDM) scheme may be overlayed with OFDM for the SBC phase.

In another embodiment, the present invention provides a loosely backward compatible (LBC) phase for the FLO AI protocol. Preferably, a layered modulation scheme is combined with a P-OFDM scheme to accomplish the LBC phase.

In another embodiment, the present invention provides a next-generation (NG) phase for the FLO AI protocol. Herein, a quasi-orthogonal P-OFDM scheme may be used.

In a further embodiment, modifications to a previous FLO AI protocol are provided. Preferably, the modifications relate to frame structure, pilot pattern and bit/subcarrier interleaving.

In accordance with the present invention, FLO technology supports the use of a layered modulation scheme. Notably, layered modulation is an implementation of a superposition coding scheme. For example, in superposition coding, coded signals for two different users are combined together and transmitted at the same time. A user with better signal quality first decodes the coded signal intended for the user with worse signal quality, subtracts it from the combined signal, and then decodes its own message. The user with worse signal quality decodes its own message only, and may treat the power allocated to the coded signal intended for the user with better signal quality as additional Gaussian noise.

According to layered modulation, a FLO data stream is divided into a base layer (BL) that all users can decode, and an enhancement layer (EL) that is decoded in areas where a higher signal-to-noise ratio (SNR) is available, for example. Previously, transmission rates were governed by mobile terminals farthest away in a cell. Hence, a mobile terminal near a base station having good signal quality did not benefit because it experienced the same poor transmission rate used for a mobile terminal far away from the base station having poor signal quality.

By using layered modulation, a different type of signal may be transmitted to mobile terminals near the base station using the enhancement layer. Accordingly, mobile terminals near the base station may benefit because signals can be transmitted at a higher transmission rate on the enhancement layer.

Moreover, a network can be upgraded more easily using the layered modulation scheme. This is because mobile terminals using older technology may continue to decode signals using previous techniques on the base layer while new mobile terminals can decode signals on both the base layer and enhanced layer.

In accordance with embodiments of the present invention, content transmitted on the different layers may be coded using various coding schemes. For example, wide-band speech coding schemes, such as Adaptive Multi Rate-Wideband (AMR-WB) and Enhanced Variable Rate Coding-Wideband (EVRC-WB) may be used. Moreover, High Efficiency Advanced Audio Coding (HE-AAC), which is an extension of low complexity AAC and optimized for low bit-rate and part of MPEG-4 may be used. Scalable Video Coding (SVC), which is an extension of H.264/MPEG-4 AVC, may also be used.

In accordance with embodiments of the present invention, content may be coded into two or more layers. Preferably, a transmitter selects the number of layers to deliver based on a channel or traffic capacity/condition. At a receiving side, if a content player is not capable of decoding or using enhanced-layer data, it may still be able to play base-layer data according to previous techniques.

In accordance with the present invention, a FLO AI protocol is optimized for layered content. In one embodiment, a scheme implementing layered modulation and enhanced layered modulation, which are implementations of superposition coding, is used to optimize the FLO AI protocol. Both layered modulation and enhanced layered modulation may have issues with regard to inter-layer interference (ILI) that is not white Gaussian noise. However, ILI is mitigated in enhanced layered modulation.

In another embodiment, a scheme implementing layered modulation and precoded orthogonal frequency division multiplexing (P-OFDM) is used to optimize the FLO AI protocol. In P-OFDM, spreading sequences are utilized in the frequency domain, wherein at least two layers of spreading are applied. Furthermore, a Fourier transformation matrix may be applied in the time domain while a Walsh-Hadmard matrix, for example, may be applied in the frequency domain. Accordingly, by using this scheme, higher frequency diversity gain is achieved by implementing frequency domain precoding. Moreover, the scheme does not utilize feedback, and is therefore suitable for broadcast applications. Attributes associated with the scheme include low implementation complexity and strong backward compatibility.

In another embodiment, a scheme implementing overloaded OFDM and Quasi-Orthogonal P-OFDM is used to optimize the FLO AI protocol. Using this scheme, inter-layer interference (ILI) is lowered. Preferably, higher frequency diversity gain is achieved using overloaded preceding. Attributes associated with the scheme include non-use of feedback, higher spectral efficiency with whitening interlayer interference (ILI), high scalability and considerably low implementation complexity.

FIG. 1 is a graph of achievable transmission rates on a broadcast channel with additive white Gaussian noise. As shown in FIG. 1, optimal broadcast channel capacity may be achieved by superimposing two signals together. Notably, superposition coding with interference cancellation outperforms time division multiplexing (TDM) and frequency division multiplexing (FDM) schemes in most time. As stated above, layered modulation is an implementation for superposition coding.

Figure 2:
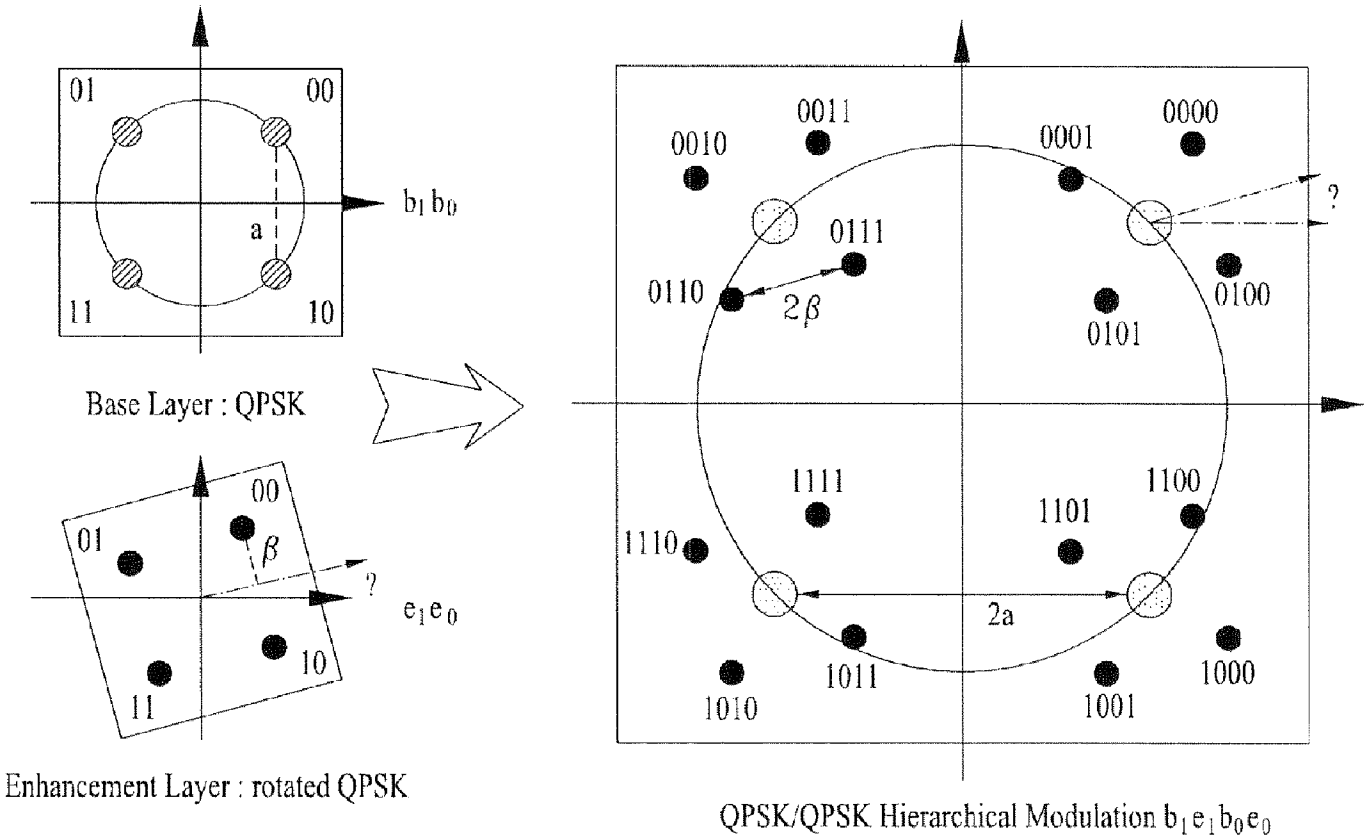
FIG. 2 illustrates an enhanced layered modulation scheme in accordance with one embodiment of the present invention.

FIG. 2 illustrates an enhanced layered modulation scheme in accordance with one embodiment of the present invention. Referring to FIG. 2, a base layer transmission is modulated using QPSK modulation, for example, and an enhancement layer transmission is modulated using a rotated QPSK modulation scheme, for example. As a result, QPSK/QPSK hierarchical modulation may be applied to the transmission signals. Notably, a previous FLO layered modulation protocol is a case where a rotational angle is zero.

Figure 3:
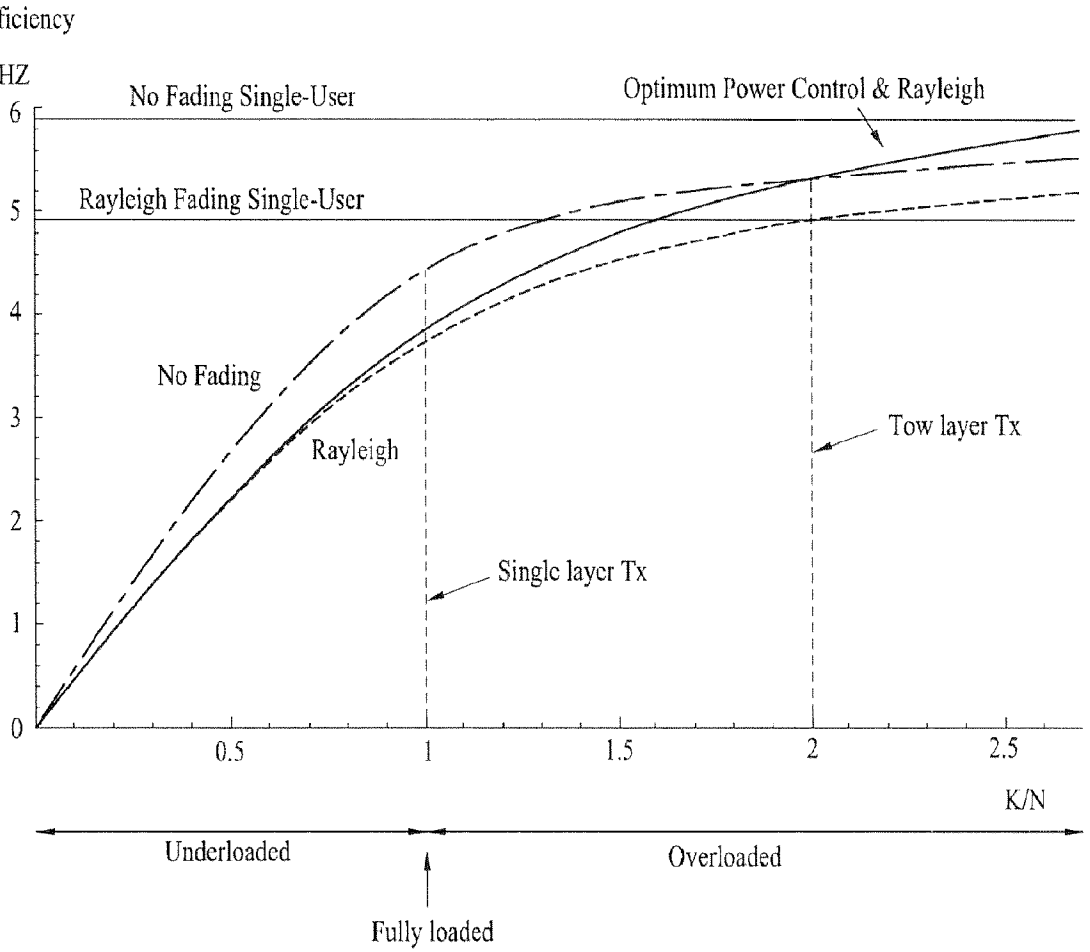
FIG. 3 is a graph illustrating optimum spectral efficiency of a transmission in accordance with one embodiment of the present invention.

FIG. 3 is a graph illustrating optimum spectral efficiency of a transmission in accordance with one embodiment of the present invention. Referring to FIG. 3, an energy-per-bit to noise-density ratio (Eb/No) is 10 dB.

Figure 4:
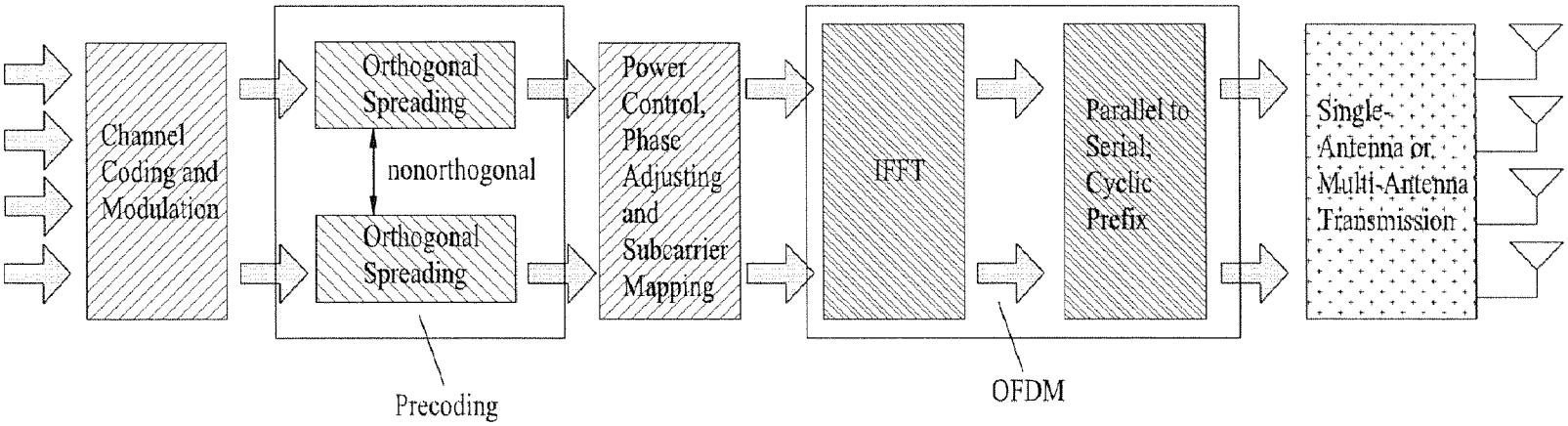
FIG. 4 illustrates a precoded OFDM transmitter structure in accordance with one embodiment of the present invention.

FIG. 4 illustrates a precoded OFDM transmitter structure in accordance with one embodiment of the present invention. Here, OFDM by itself may not be optimal in terms of frequency diversity. Thus, low rate channel coding may be applied to achieve more frequency/time diversity. OFDM by itself may also not be optimal in terms of spectral efficiency in a fading channel.

Therefore, in accordance with the present invention, higher frequency diversity gain and throughput is achieved by applying a frequency-domain precoding scheme. Preferably, channel capacity loss by frequency-selective fading can be recovered by overloaded spreading, as shown in FIG. 3. Consequently, low rate channel coding may not be necessary. Moreover, by precoding with orthogonal or quasi-orthogonal coding, both single and multiple layered content delivery is optimized. A benefit of frequency-domain precoding is its high scalability.

In one embodiment, preceding is achieved by applying a Walsh-Hadmard matrix and scrambling. Preferably, signals of two layers are each precoded with a Walsh-Hadmard matrix. One of the precoded signals is then additionally scrambled using random codes of the same length. For example, the scrambling codes may be chosen from an extended S(2) code family with combining two codes ($c=c1(w0+jc2)\cdot(2k\ w1)$, $k=1, 2, 3, \ldots$).

In one embodiment, preceding is achieved by applying a quasi-orthogonal function (QOF). Preferably, an additional preceding matrix may be generated by multiplying a Walsh-Hadmard matrix and a specific masking function. Here, preceding vectors drawn from the same set of QOFs are orthogonal; however, preceding vectors drawn from different sets of QOFs are not completely orthogonal. A preceding matrix with QOFs has minimal min-max cross-correlation that is constant and predictable.

In accordance with the present invention, if an identity matrix is used as the preceding matrix, then the precoded OFDM structure is essentially the same as a regular OFDM structure. Accordingly, a regular QPSK or 16QAM modulation scheme may be applied. Alternatively, a layered QPSK/QPSK modulation scheme may be employed.

In accordance with the present invention, if an orthogonal matrix, such as a Walsh-Hadmard matrix, for example, is used as the precoding matrix, a regular QPSK or 16QAM modulation scheme may be applied. A layered QPSK/QPSK modulation scheme may also be employed.

In accordance with the present invention, if a full-rank quasi-orthogonal matrix (e.g. QOFs), is used as a two-layer precoding matrix, then a regular QPSK or 16QAM modulation scheme may applied for each layer.

As shown in FIG. 4, after preceding, at least one of power control, phase adjusting and subcarrier mapping may be applied to a precoded stream. Thereafter, OFDM is applied to the stream prior to transmission.

Table (1) below illustrates a transmit mode table used in conjunction with a FLO broadcasting system in accordance with one embodiment of the present invention.

(1)

| Mode Number | Modulation | Turbo Code Rate |
|---|---|---|
| 0 | QPSK | ⅓ |
| 1 | QPSK | ½ |
| 2 | 16-QAM | ⅓ |
| 3 | 16-QAM | ½ |
| 4 | 16-QAM | ⅔ |
| $5^{34}$ | QPSK | ⅕ |
| 6 | Layered Modulation With Energy Ratio 4 | ½ |
| 7 | Layered Modulation With Energy Ratio 4 | ½ |
| 8 | Layered Modulation With Energy Ratio 4 | ⅔ |
| 9 | Layered Modulation With Energy Ratio 6.25 | ⅓ |
| 10 | Layered Modulation With Energy Ratio 6.25 | ½ |
| 11 | Layered Modulation With Energy Ratio 6.25 | ⅔ |

In accordance with one embodiment of the present invention, a FLO AI protocol is optimized by overlaying OFDM with P-OFDM. According to this scheme, an original base layer signal is unchanged. However, an enhancement layer signal is modulated with a multi-rate Walsh-Hadmard precoded OFDM.

By overlaying OFDM with P-OFDM strict backward compatibility is realized. For example, existing mobile terminals (subscriber stations) with older capabilities can demodulate the base layer signal without having to upgrade to the new scheme. Meanwhile, newer mobile terminals (subscriber stations) are able to demodulate the enhancement layer signal, and therefore can coexist with the existing mobile terminals in the new scheme.

Moreover, overlaying OFDM with P-OFDM produces higher spectral efficiency. Specifically, inter-layer interference is whitened or mitigated. Therefore, base layer signal demodulation is improved. Also, because of frequency-domain spreading, the probability of an enhancement layer signal being demodulated is improved.

In one embodiment, 4000 active subcarriers may be divided into eight evenly spaced interlaces of 500 subcarriers each. Preferably, in each OFDM symbol, one interlace (2 or 6) carries pilot modulation symbols used for channel estimation. The other seven interlaces carry data modulation symbols.

Furthermore, a 500-subcarrier enhancement layer interlace of a data stream to be transmitted may be precoded with multi-rate preceding matrices. For example, if eight data streams exist each having a 500-subcarrier enhancement layer interlace, then each 500-subcarrier interlace is divided into the following six sub-interlaces 1) 256-subcarrier sub-interlace; 2) 128-subcarrier sub-interlace; 3) 64-subcarrier sub-interlace; 4) 32-subcarrier sub-interlace; 5) 16-subcarrier sub-interlace; and 6) 4-subcarrier sub-interlace. All or part of the six sub-interlaces are then precoded. Thereafter, two levels of interleaving are executed. At a first level of interleaving, for each 500-subcarrier interlace, the six sub-interlaces are evenly distributed and interlaced with each other. At a second level of interleaving, the eight 500-subcarrier interlaces are evenly interleaved.

Figure 5:
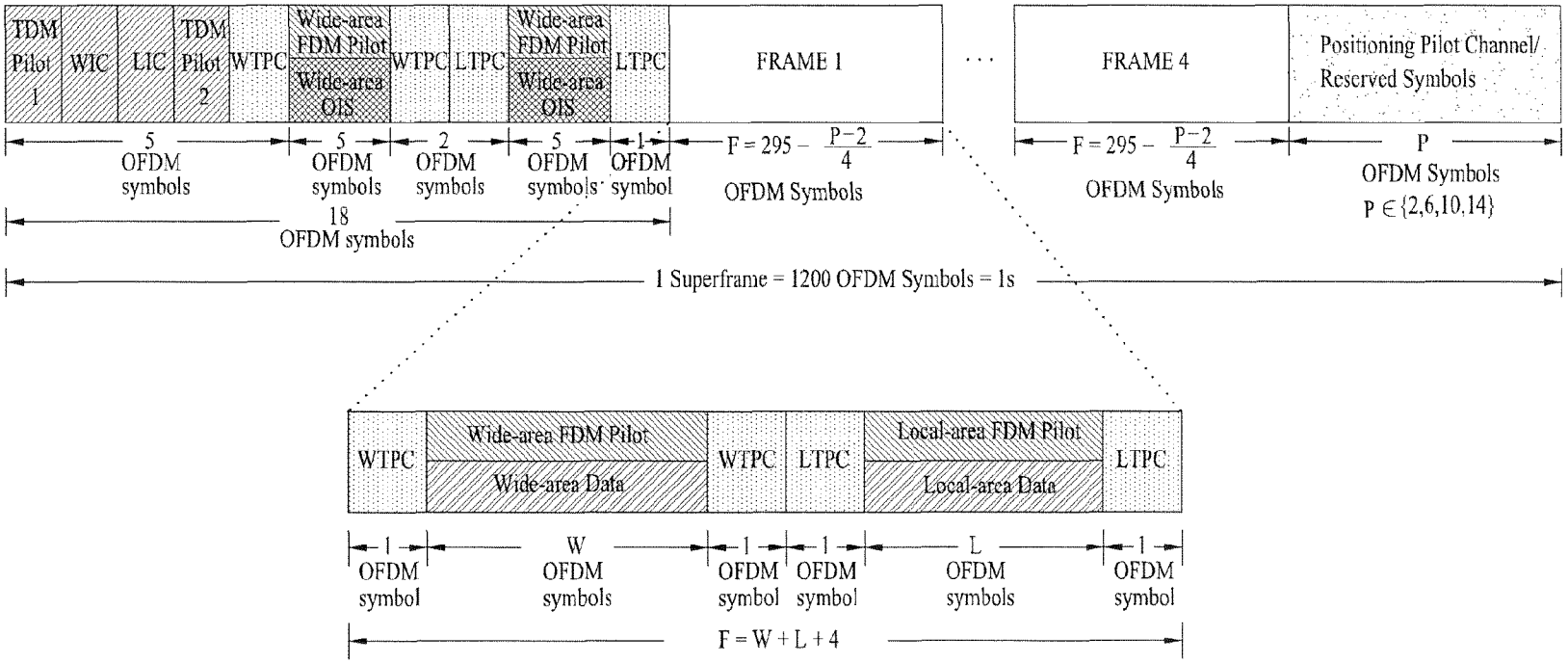
FIG. 5 illustrates a superframe structure in accordance with one embodiment of the present invention.
Figure 6:
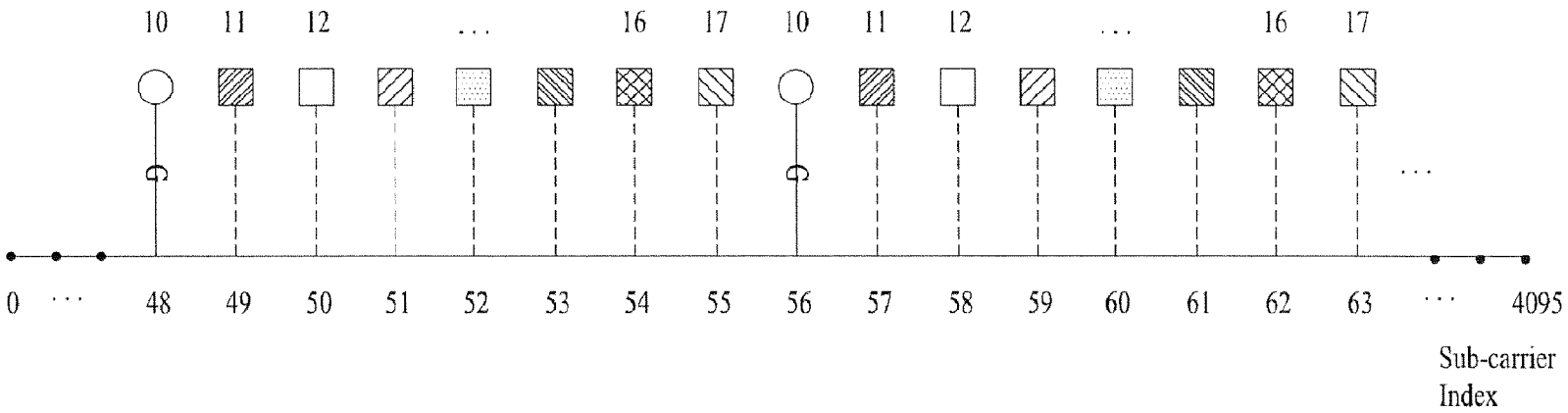
FIG. 6 illustrates a pilot and data interlacing structure in accordance with one embodiment of the present invention.
Figure 7:
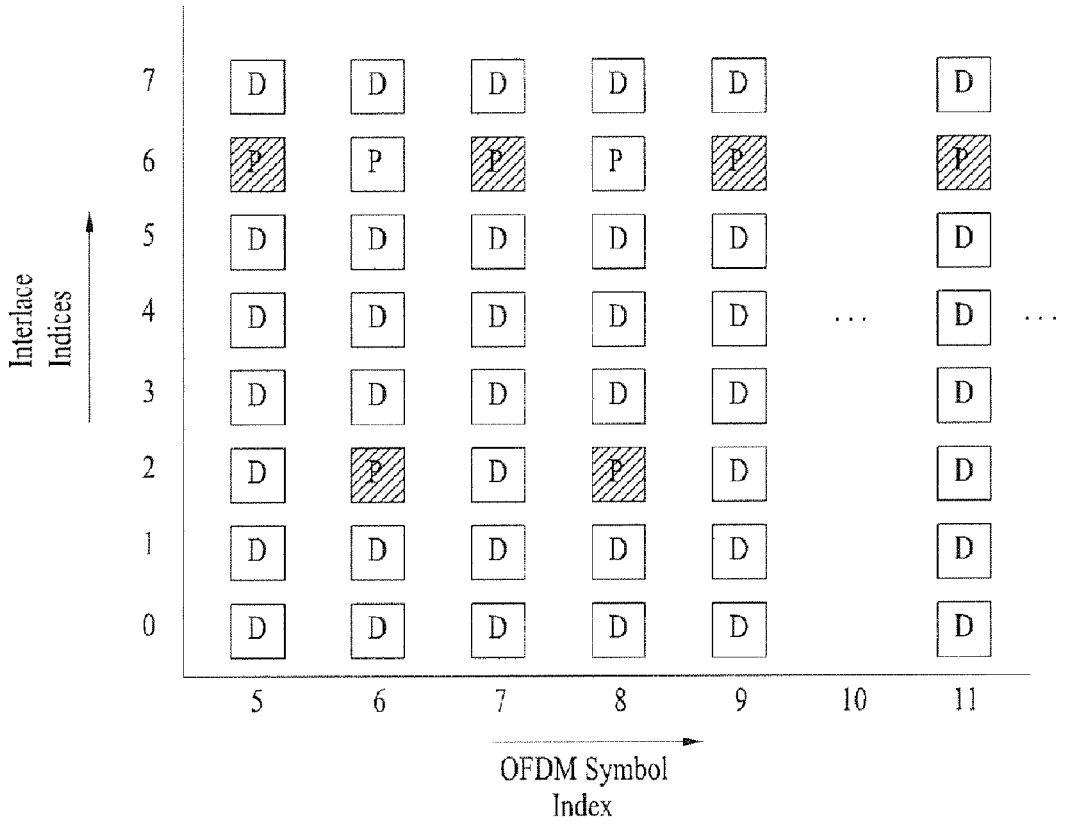
FIG. 7 illustrates interlace allocation to an FDM pilot in accordance with one embodiment of the present invention.

FIG. 5 illustrates a superframe structure in accordance with one embodiment of the present invention. FIG. 6 illustrates a pilot and data interlacing structure in accordance with one embodiment of the present invention. FIG. 7 illustrates interlace allocation to an FDM pilot in accordance with one embodiment of the present invention.

Referring to FIGS. 5-7, an FDM pilot channel is preferably allocated to slot 0 in OIS and Data channels. An interlace occupied depends on an OFDM symbol index in the superframe: 2 (even), 6 (odd). Staggering of a pilot interlace enables doubling the time duration of a channel estimate at a mobile terminal.

In accordance with one embodiment of the present invention, a FLO AI protocol is optimized by applying layered modulation and P-OFDM. According to this scheme, a superframe and frame structure is unchanged.

In one embodiment, a 500-subcarrier interlace of a data stream to be transmitted may be precoded with multiple variable-sized precoding matrices where it is necessary. For example, if eight data streams exist each having a 500-subcarrier interlace, then each 500-subcarrier interlace is divided into the following six sub-interlaces: 1) 256-subcarrier sub-interlace; 2) 128-subcarrier sub-interlace; 3) 64-subcarrier sub-interlace; 4) 32-subcarrier sub-interlace; 5) 16-subcarrier sub-interlace; and 6) 4-subcarrier sub-interlace. Accordingly, two levels of interleaving are executed. At a first level of interleaving, for each 500-subcarrier interlace, the six sub-interlaces are evenly distributed and interlaced with each other. At a second level of interleaving, the eight 500- subcarrier interlaces are evenly interleaved.

Figure 8:
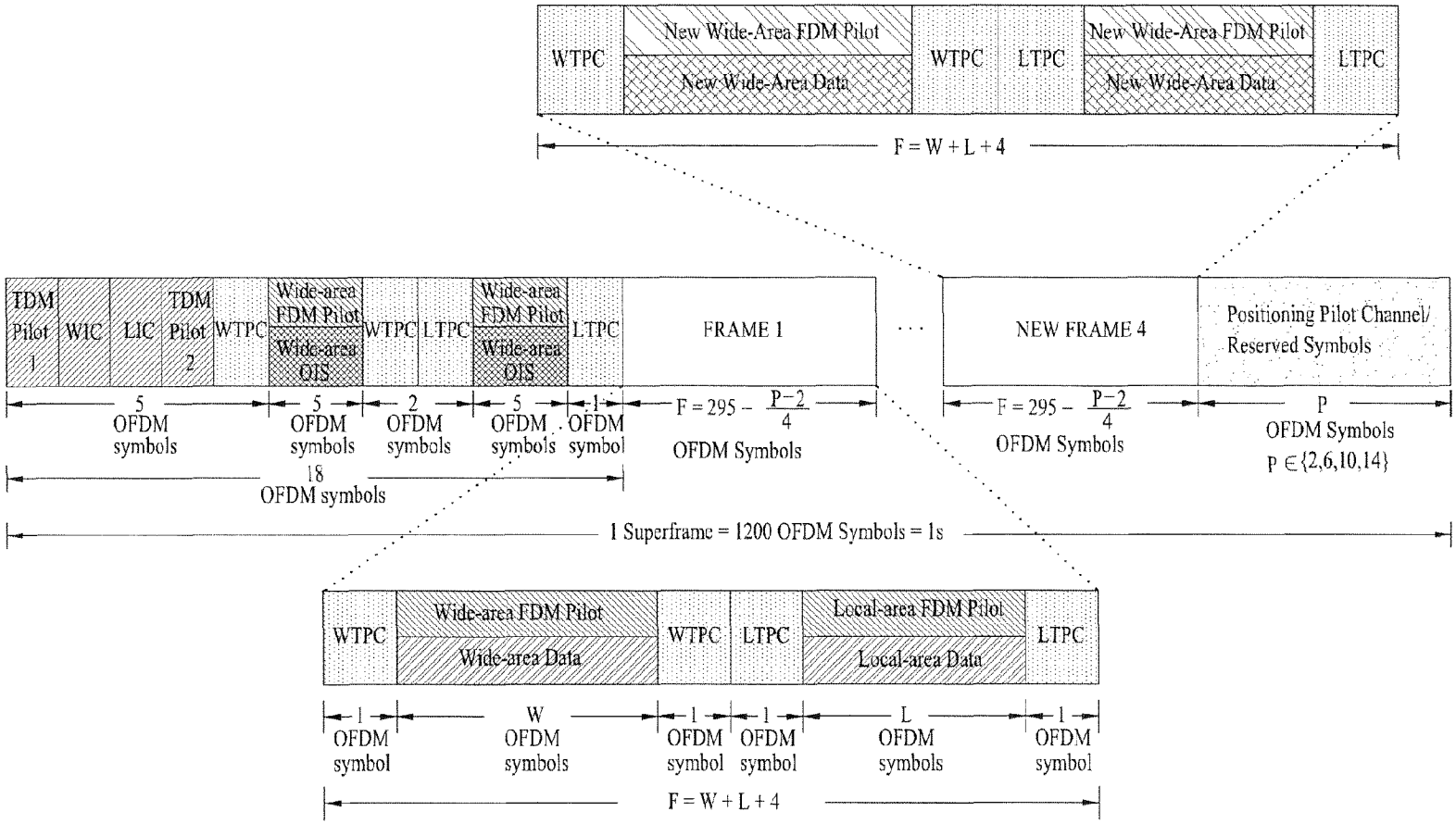
FIG. 8 is a superframe structure in accordance with another embodiment of the present invention.

FIG. 8 is a superframe structure in accordance with another embodiment of the present invention. In one embodiment, for a single antenna mode, a total FFT size is 4096, a total number of used subcarriers is 4000, a total number of pilot subcarriers is 416, a total number of data subcarriers is 3584 (64×56), a data interlace number is 7, and a size of each data interlace is 512 subcarriers per interlace. In another embodiment, for a multiple antenna mode, a total FFT size is 4096, a total number of used subcarriers is 4000, a total number of pilot subcarriers is 544, a total number of data subcarriers is 3456 (64×54), a data interlace number is 9, and a size of each data interlace is 384 subcarriers per interlace. A precoding matrix size can be 2×2, 4×4, 8×8, 16×16, 32×32, 64×64, 128×128, 256×256 and 512×512, for example. Notably, a regular OFDM scheme may be considered to have a precoding matrix size of 1×1.

In the single antenna mode, pilot subcarriers occupy 416 subcarriers of a total 4000 subcarriers. For even symbols, the pilot 0 is placed on Subcarrier 0. The next odd pilot i=2k+1 is placed nine subcarriers away from the i−1 pilot, wherein k=0, 1, 2, . . . 20. The next even pilot j=2k+2 is placed ten subcarriers away from the j−1 pilot.

For odd symbols, the pilot 0 is placed on Subcarrier 13. The next odd pilot i=2k+1 is placed nine subcarriers away from the i−1 pilot. The next even pilot j=2k+2 is placed ten subcarriers away from the j−1 pilot.

Moreover, in the single antenna mode, data subcarriers occupy 3584 subcarriers that are mixed into seven evenly spaced interlaces. For even symbols, the data subcarriers start from Subcarrier 1 and skip every pre-occupied pilot subcarrier. For odd symbols, the data subcarriers start from Subcarrier 0 and skip every pre-occupied pilot subcarrier.

In a dual transmission mode, for Tx 0, pilot subcarriers occupy 544 subcarriers of a total 4000 subcarriers. For even symbols, the pilot 0 is placed on Subcarrier 0. The next odd pilot i=2k+1 is placed seven subcarriers away from the i−1 pilot, wherein k=0, 1, 2, . . . 20. The next even pilot j=2k+2, which is a null pilot, is placed eight subcarriers away from the j−1 pilot.

For odd symbols, the pilot 0 is placed on Subcarrier 4. The next odd pilot i=2k+1, which is a null pilot, is placed seven subcarriers away from the i−1 pilot. The next even pilot j=2k+2 is placed eight subcarriers away from the j−1 pilot.

For Tx 1, pilot subcarriers occupy 368 subcarriers of a total 4000 subcarriers. For even symbols, the pilot 0 is placed on Subcarrier 0. The next odd pilot i=2k+1, which is a null pilot, is placed seven subcarriers away from the i−1 pilot, wherein k=0, 1, 2, . . . 20. The next even pilot j=2k+2, which is a null pilot, is placed eight subcarriers away from the j−1 pilot.

For odd symbols, the pilot 0 is placed on Subcarrier 13. The next odd pilot i=2k+1 is placed seven subcarriers away from the i−1 pilot. The next even pilot j=2k+2, which is a null pilot, is placed eight subcarriers away from the j−1 pilot.

Moreover, in the dual transmission mode, data subcarriers occupy 3072 (or 3456) subcarriers that are mixed into seven evenly spaced interlaces. For even symbols, the data subcarriers start from Subcarrier 1 and skip every pre-occupied pilot subcarrier. For odd symbols, the data subcarriers start from Subcarrier 0 and skip every pre-occupied pilot subcarrier.

Figure 9:
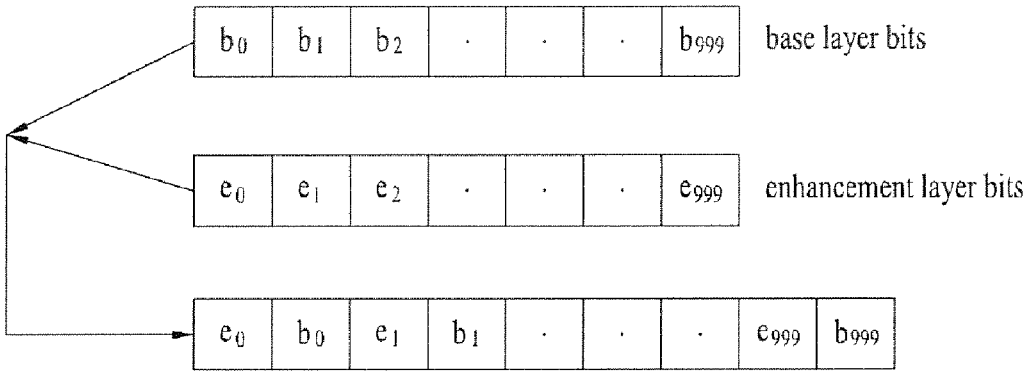
FIG. 9 illustrates a bit interleaving structure for a layered transmission in accordance with one embodiment of the present invention.

FIG. 9 illustrates a bit interleaving structure for a layered transmission in accordance with one embodiment of the present invention. Referring to FIG. 9, bit interleaved truncated exponential partitions (TEPs) are written into one or more data slot buffers. For QPSK and 16-QAM modulations, each data slot buffer has a size of 1000 bits and 2000 bits, respectively. For layered modulation, the data buffer size is 2000 bits. Preferably, the base and enhancement component bits are re-ordered before filling the buffer.

Figure 10:
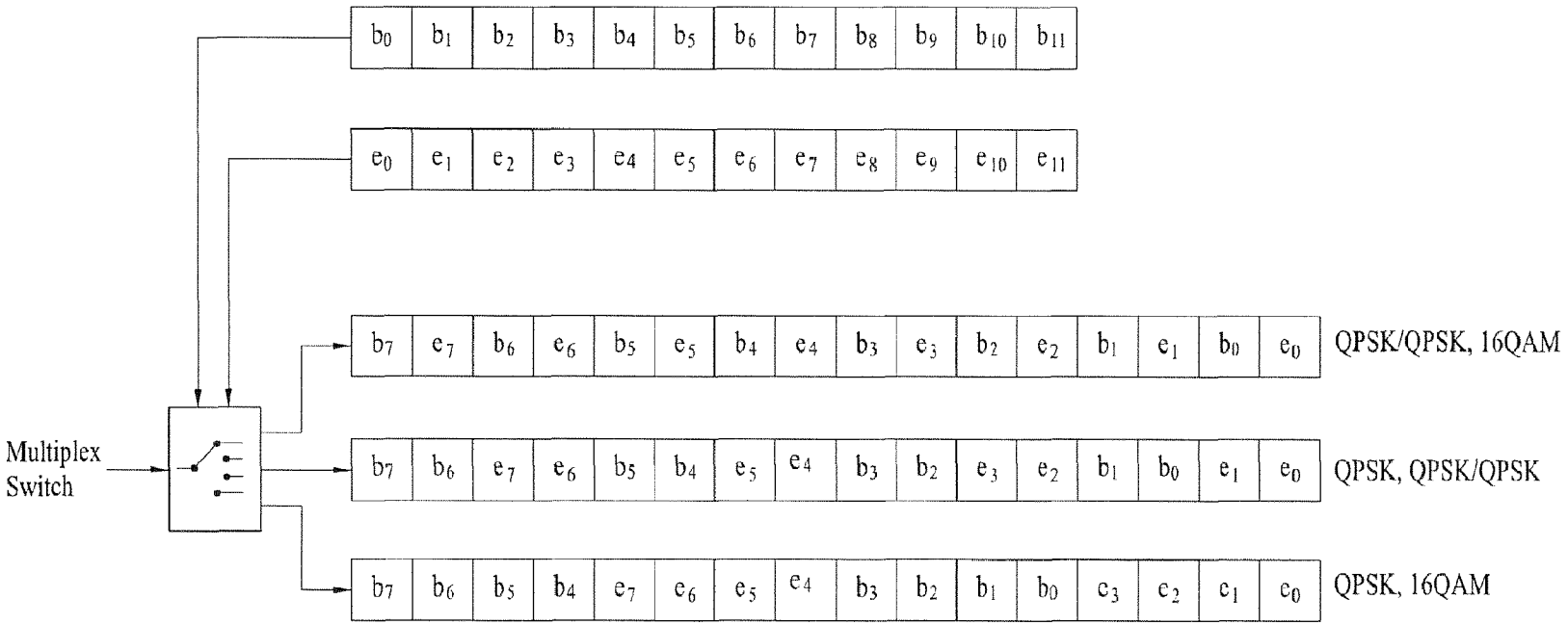
FIG. 10 illustrates a bit interleaving structure for a layered transmission in accordance with another embodiment of the present invention.

FIG. 10 illustrates a bit interleaving structure for a layered transmission in accordance with another embodiment of the present invention. Referring to FIG. 10, bit interleaved truncated exponential partitions (TEPs) are written into one or more data slot buffers. For QPSK and 16-QAM modulations, each data slot buffer has a size of 1000 bits and 2000 bits, respectively. For layered modulation, the data buffer size is 2000 bits. Preferably, the base and enhancement component bits are re-ordered before filling the buffer.

Figure 11:
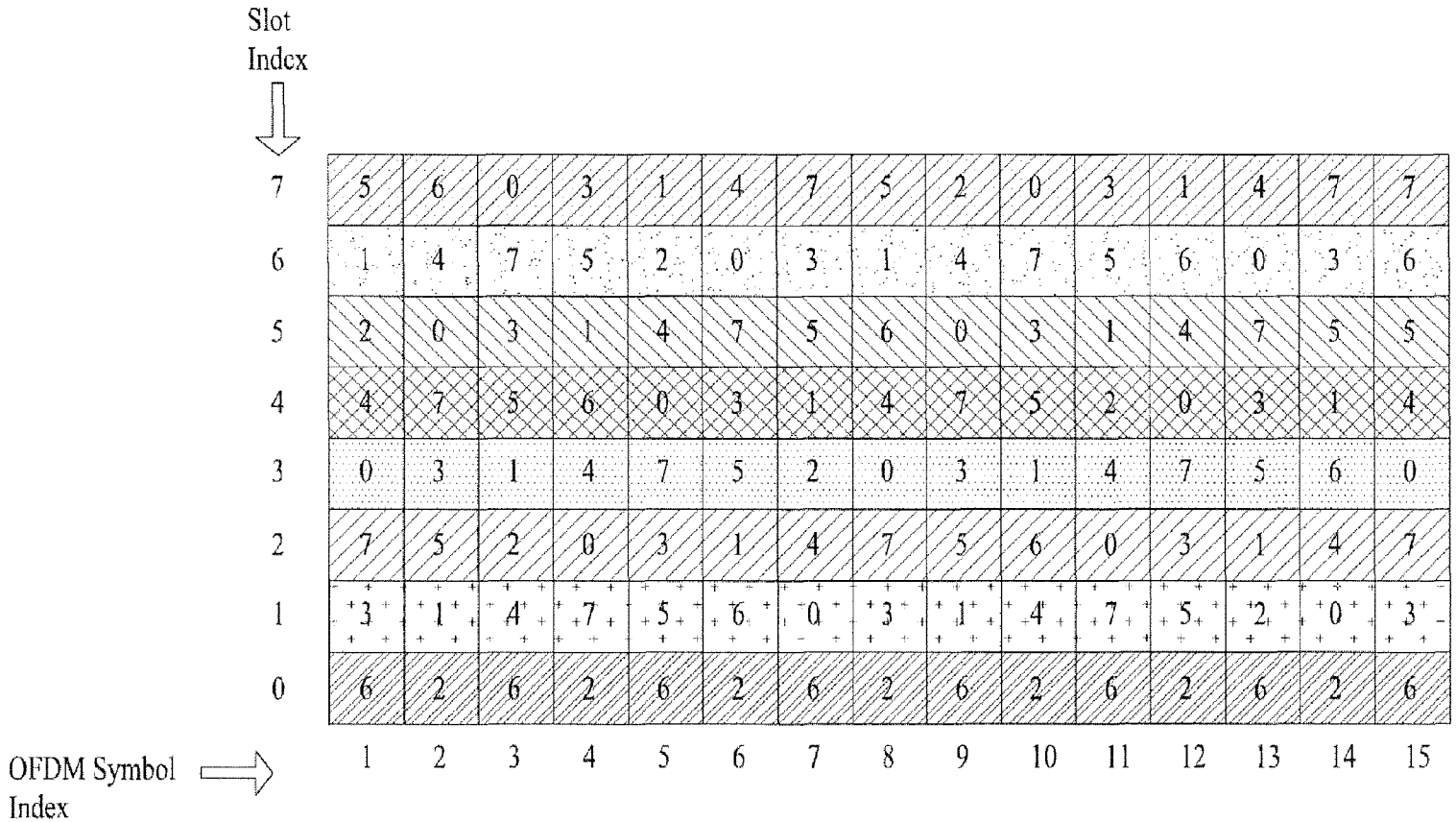
FIG. 11 illustrates slot to interlace mapping in accordance with one embodiment of the present invention.

FIG. 11 illustrates slot to interlace mapping in accordance with one embodiment of the present invention. Referring to FIG. 11, mapping depends on an OFDM symbol index (1-1199). Herein, a symbol pattern repeats itself after 14 consecutive OFDM symbols. Preferably interlaces 2/6 are used alternatively for an FDM pilot. Other interlaces are assigned to data slots. According to this mapping scheme, it is ensured that each slot is assigned to interlaces next to the pilot interlace the same fraction of time. Moreover, the interlaces occupied by a multicast logical channel (MLC) change from one OFDM symbol to the next within a superframe.

Figure 12:
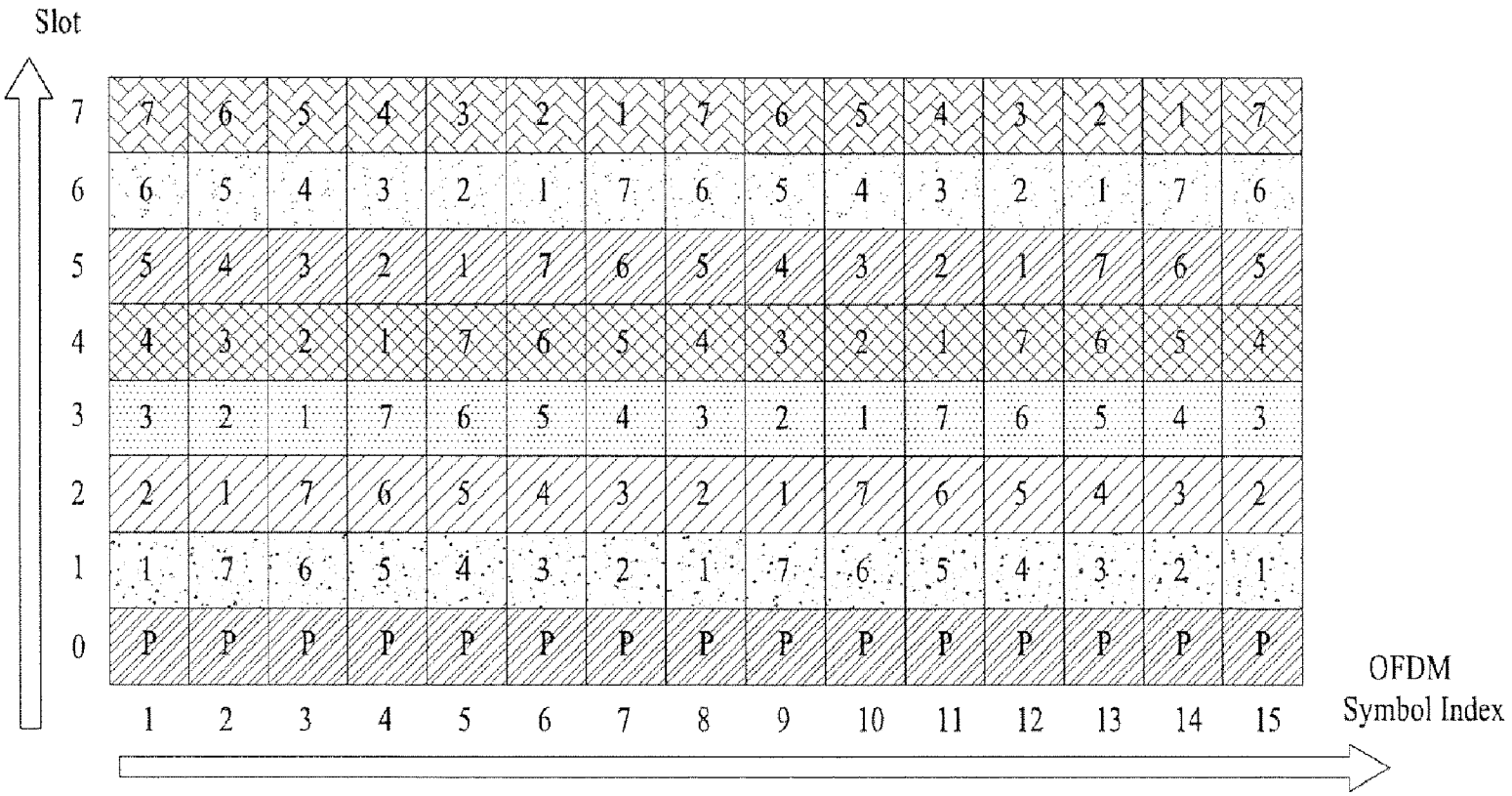
FIG. 12 illustrates slot to interlace mapping in accordance with another embodiment of the present invention.

FIG. 12 illustrates slot to interlace mapping in accordance with another embodiment of the present invention. Referring to FIG. 12, mapping depends on an OFDM symbol index (1-1199). Herein, a symbol pattern repeats itself after 7 consecutive OFDM symbols. Preferably interlace 0 is fixed for an FDM pilot. Interlaces 1-7 are assigned to data slots. According to this mapping scheme, it is ensured that each slot is assigned to interlaces next to the pilot interlace the same fraction of time. Moreover, the interlaces occupied by a multicast logical channel (MLC) change from one OFDM symbol to the next within a superframe.

In accordance with one embodiment of the present invention, a FLO AI protocol is optimized by applying layered modulation for scalable video coding (SVC). In one example, a scalable extension of an H.264/AVC video coding scheme for FLO provides layered transmission of video. Herein, a base layer is H.264 extended profile compliant, wherein a standard H.264 decoder can decode it. Meanwhile, an enhancement layer follows H.264 bitstream syntax. Preferably, more B-slices are utilized for increased channel capacity and video scalability.

Layered modulation provides two-layer transmission of data streams different protection for each layer. In addition to channel coding, protection is controlled by an ER (error rate) defined by FLO. In accordance with the present invention, a base layer video stream may be transmitted with a base layer QPSK modulation scheme, and an enhancement layer video stream may be transmitted with an enhancement layer QPSK modulation scheme. Accordingly, the scheme works well when ER is large, such as ER=6.25, for example. Moreover, the scheme is optimal when ER=4.0, wherein the base layer coverage and enhancement layer coverage are close to each other.

In accordance with one embodiment of the present invention, a FLO AI protocol is optimized by applying enhanced layer modulation for SVC. In one example, for QPSK/QPSK with ER=4.0, the base layer QPSK is allocated 80% transmission power while the enhancement layer QPSK is allocated the other 20% transmission power. Notably, although the coverage of the base layer is almost the same as the enhancement layer, the efficiency of the base layer transmission is considerably low. This is because the base layer QPSK suffers from inter-layer interference from the enhancement layer QPSK.

Accordingly, in one embodiment of the present invention, the enhancement layer video stream is transmitted with the base layer QPSK and the base layer video stream is transmitted with the enhancement layer QPSK. Additionally, the ER is decreased from ER=4.0 to ER=3.25 or 3.0 with a resolution assumption of 0.25. By doing so, the power efficiency of the base layer video stream, as well as the entire layered modulation scheme, is increased while maintaining the base layer coverage and the enhancement layer coverage close to each other.

In one embodiment, for ER=3.0 QPSK/QPSK layered modulation, the base layer is allocated 75% transmission power and the enhancement layer is allocated 25% transmission power. Herein, the enhancement layer has slightly better coverage than the base layer within a 1 dB difference approximately. Moreover, the ER=3.0 enhancement layer has a higher spectral efficiency than the ER=4.0 enhancement layer. The ER=3.0 base layer has less spectral efficiency than the ER=4.0 base layer. However, by optimizing ER=3.0 QPSK/QPSK, higher base layer spectral efficiency and lower demodulation error are achievable. For ER=3.25 QPSK/QPSK layered modulation, conclusions similar to that of ER=3.0 may be reached.

Table (2) below illustrates a flow description message used in conjunction with a FLO AI protocol in accordance with one embodiment of the present invention.

(2)

| Field | Length (bits) |
|---|---|
| CPPHeader | 32 or 40 |
| FlowCount | 7 |
| FlowBlobLength | 8 |
| Reserved0 | 1 |
| FlowCount occurrences of the remaining fields | |
| FlowID_bits_4_thru_19_SameAsBefore | 1 |
| FlowID_bits_4_thru_19 | 0 or 16 |
| FlowID_bits_0_thru_3 | 4 |
| RFChannelID | 8 |
| MLCIDSameAsBefore | 1 |
| MLC_ID | 0 or 8 |
| TransmitMode | 0 or 4 |
| OuterCodeRate | 0 or 4 |
| FlowBlob | FlowBlobLength |
| StreamID | 2 |
| StreamResidualErrorProcessing | 2 |
| StreamUsesBothComponents | 1 |
| Reserved 1 | Variable (0-7) |

As shown in Table (2), a TransmitMode field indicates a transmit mode used by the multicast logical channel (MLC) carrying the flow. If an MLCIDSameAsBefore field is set to 1, then the network omits the TransmitMode field. Otherwise, the network sets the TransmitMode field to the physical layer mode used to transmit the MLC.

Tables (3) and (4) below illustrate a flow description message used in conjunction with a FLO AI protocol in accordance with another embodiment of the present invention.

(3)

| Field | Length (bits) |
|---|---|
| CPPHeader | 32 or 40 |
| FlowBlobLength | 8 |
| FlowCount | 7 |
| Reserved0 | 1 |
| FlowCount occurrences of the remaining fields | |
| FlowID_bits_4_thru_19_SameAsBefore | 1 |
| FlowID_bits_4_thru_19 | 0 or 16 |
| FlowID_bits_0_thru_3 | 4 |
| RFChannelID | 8 |
| MLCIDSameAsBefore | 1 |
| MLC_ID | 0 or 8 |
| TransmitMode | 0 or 4 |
| TransmitModeEx | 0 or 2 |
| OuterCodeRate | 0 or 4 |
| FlowBlob | FlowBlobLength |
| StreamID | 2 |
| StreamResidualErrorProcessing | 2 |
| StreamUsesBothComponents | 1 |

(4)

| Field | Length (bits) |
|---|---|
| CPPHeader | 32 or 40 |
| FlowBlobLength | 8 |
| FlowCount | 7 |
| Reserved0 | 1 |
| FlowCount occurrences of the remaining fields | |
| FlowID_bits_4_thru_19_SameAsBefore | 1 |
| FlowID_bits_4_thru_19 | 0 or 16 |
| FlowID_bits_0_thru_3 | 4 |
| RFChannelID | 8 |
| MLCIDSameAsBefore | 1 |
| MLC_ID | 0 or 8 |
| TransmitMode | 0 or 4 |
| OuterCodeRate | 0 or 4 |
| FlowBlob | FlowBlobLength |
| StreamID | 2 |
| StreamResidualErrorProcessing | 2 |
| StreamUsesBothComponents | 1 |
| TransmitModeEx | 0 or 2 |
| Reserved1 | Variable (0-5) |

As shown in Tables (3) and (4), a TransmitModeEx field indicates a transmit mode extension used by the MLC carrying the flow. If an MLCIDSameAsBefore field is set to 1, then the network omits the TransmitModeEx field. Otherwise, the network uses the TransmitModeEx field and a previous 4-bit TransmitMode parameter to indicate the physical layer mode used to transmit the MLC. Examples of values for the TransmitModeEx field are as follows:

00—Control channel transmit mode is decided by a Control ChannelTxMode field;

01—Enhanced hierarchical modulation is supported;

10—New puncture pattern is applied; and

11—Reserved.

Tables (5) and (6) below illustrate parts 1 and 2, respectively, of a systems parameters message used in conjunction with a FLO AI protocol in accordance with one embodiment of the present invention.

(5)

| Field | Length (bits) |
|---|---|
| SYS_TIME | 32 |
| LP_SEC | 8 |
| LTM_OFF | 6 |
| DAYLT | 1 |
| NetworkID | 16 |
| InfrastructureID | 16 |
| ProtocolVersion | 8 |
| MinProtocolVersion | 8 |
| MinMonitorCycleIndex | 4 |
| NumPPCSymbols | 2 |
| NumDataSymbols | 9 |
| DataMACTrailerLength | 4 |
| ControlMACHdrLength | 2 |
| StreamLayerTrailerLength | 4 |
| CPPHdrLength | 3 |
| ControlChannelTxMode | 4 |
| ControlChannelOuterCodeRate | 4 |
| ControlChannelAllocation | 3 |
| ControlChannelStartOffset | 9 |
| ControlChannelSlotInfo | 7 |

(6)

| | |
|---|---|
| ControlProtocolCapsuleID | 3 |
| NumControlSequencePairs | 3 |
| Reserved | 4 |
| Include NumControlSequencePairs of the following two fields: | |
| Bin0_ControlSequenceNumber | 16 |
| Bin1_ControlSequenceNumber | 16 |
| StartMLC | 8 |
| NumMLCRecords | 8 |
| Include NumMLCRecords of the following fields: | |
| MLCPresent | 1 |
| If MLCPresent = '1', include the following fields: | |
| StartOffset | 9 |
| SlotInfo | 7 |
| StreamLengths | 23 |
| If MLCPresent = '0', include the following fields: | |
| NextSuperframeOffset | 10 |
| FixedLengthReserved | 29 |
| ReservedPaddingOctets | Variable |

Referring to Tables (5) and (6), a ControlChannelTxMode field contains a physical layer transmit mode of a control channel associated with the infrastructure. Values for this field are the same as those defined for the TransmitMode field. Preferably, the network sets this field to the transmit mode of the control channel.

Table (7) below illustrates a systems parameters message used in conjunction with a FLO AI protocol in accordance with another embodiment of the present invention.

(7)

| Field | Length (bits) |
|---|---|
| ControlChannelSlotInfo | 7 |
| ControlProtocolCapsuleID | 3 |
| NumControlSequencePairs | 3 |

-continued (7)

| Field | Length (bits) |
|---|---|
| ControlChannelTxModeEx | 2 |
| Reserved1 | 2 |
| Include NumControlSequencePairs of the following two fields: | |
| Bin0_ControlSequenceNumber | 16 |
| Bin1_ControlSequenceNumber | 16 |
| StartMLC | 8 |
| NumMLCRecords | 8 |
| Include NumMLCRecords of the following fields: | |
| MLCPresent | 1 |
| If MLCPresent = '1', include the following fields: | |
| StartOffset | 9 |
| SlotInfo | 7 |
| StreamLengths | 23 |
| If MLCPresent = '0', include the following fields: | |
| NextSuperframeOffset | 10 |
| FixedLengthReserved | 29 |
| ReservedPaddingOctets | Variable |

As shown in Table (7), a ControlChannelTxModeEx field contains a physical layer transmit mode of a control channel associated with the infrastructure. Values for this field are the same as those defined for the TransmitMode field. Preferably, the network sets this field to the transmit mode of the control channel Examples of values are as follows:

00—Control channel transmit mode is decided by a Control ChannelTxMode field;

01—Enhanced hierarchical modulation is supported;

10—New puncture pattern is applied; and

11 Reserved.

Depending on implementation, it is possible that the present invention may take the form of an entirely hardware embodiment, an entirely software embodiment or an embodiment containing both hardware and software elements. A software embodiment may include, but not be limited to, to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) may be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips may be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product may be any product that includes integrated circuit chips, ranging from toys and other low-end applications to advanced computer products having a display, a keyboard or other input device, and a central processor.

Therefore, it should be understood that the invention may be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for transmitting a signal in a wireless communication system, the method comprising:

differentiating a data stream into [at least] a first layer data stream and a second layer data stream;

channel coding [at least] *each of* the first [layer data stream] and the second layer data [stream] *streams*;

[spreading] *precoding* the channel coded first layer data stream using a Walsh-Hadmard matrix; and

[spreading] *precoding* the channel coded second layer *data* stream using an identity matrix.

2. The method of claim 1, further comprising applying a Fourier transform to at least one of the channel coded first layer data stream and the channel coded second layer data stream.

3. The method of claim 2, further comprising transmitting the [transformed] *precoded* first [layer data stream] and second layer data [stream] *streams* according to at least one of a channel condition and a quality of service requirement of the data stream to be transmitted.

4. The method of claim 1, wherein the first layer is an enhancement layer and the second layer is a base layer.

5. The method of claim 1, further comprising applying at least one of power control, phase adjusting and subcarrier mapping to at least one of the [spread channel coded] *precoded* first layer data stream and the [spread channel coded] *precoded* second layer data stream.

6. The method of claim 1, wherein the data stream includes a flow description message comprising a transmit mode extension field.

7. The method of claim 1, wherein the data stream is transmitted along with a flow description message comprising a transmit mode extension field.

8. The method of claim 1, wherein the data stream includes a system parameters message comprising a control channel transmit mode extension field.

9. The method of claim 1, wherein the data stream is transmitted with a system parameters message comprising a control channel transmit mode extension field.

10. [A system] *An apparatus* for transmitting a signal in a wireless communication system, the [system] *apparatus* comprising:

a processor for differentiating a data stream into [at least] a first layer data stream and a second layer data stream, channel coding [at least] *each of* the first [layer data stream] and the second layer data [stream] *streams*, [spreading] *precoding* the channel coded first layer data stream using a Walsh-Hadmard matrix and [spreading] *precoding* the channel coded second layer data stream using an identity matrix.

11. The [system] *apparatus* of claim 10, wherein the processor applies a Fourier transform to at least one of the channel coded first layer data stream and the channel coded second layer data stream.

12. The [system] *apparatus* of claim 11, wherein the processor transmits the [transformed] *precoded* first [layer data stream] and second layer data [stream] *streams* according to at least one of a channel condition and a quality of service requirement of the data stream to be transmitted.

13. The [system] *apparatus* of claim 10, wherein the first layer is an enhancement layer and the second layer is a base layer.

14. The [system] *apparatus* of claim 10, wherein the processor applies at least one of power control, phase adjusting and subcarrier mapping to at least one of the [spread channel coded] *precoded* first layer data stream and the [spread channel coded] *precoded* second layer data stream.

15. The [system] *apparatus* of claim 10, wherein the data stream includes a flow description message comprising a transmit mode extension field.

16. The [system] *apparatus* of claim 10, wherein the data stream is transmitted along with a flow description message comprising a transmit mode extension field.

17. The [system] *apparatus* of claim 10, wherein the data stream includes a system parameters message comprising a control channel transmit mode extension field.

18. The [system] *apparatus* of claim 10, wherein the data stream is transmitted with a system parameters message comprising a control channel transmit mode extension field.

* * * * *